United States Patent [19]

Carlson

[11] Patent Number: 4,708,489
[45] Date of Patent: Nov. 24, 1987

[54] BLENDING MACHINE

[75] Inventor: Gary Carlson, Cherry Hill, N.J.

[73] Assignee: Wizards Ice Cream & Confectionery Shoppe, Ltd., Chicago, Ill.

[21] Appl. No.: 1,708

[22] Filed: Jan. 9, 1987

Related U.S. Application Data

[63] Continuation of Ser. No. 616,965, Jun. 4, 1984, abandoned.

[51] Int. Cl.<sup>4</sup> ............................ A23G 9/00; B01F 7/24
[52] U.S. Cl. ....................................... 366/149; 62/342; 99/455; 241/119.12; 241/246; 241/260.1; 366/195; 366/196; 366/203; 366/204; 366/295; 366/319; 366/323; 425/200; 425/206
[58] Field of Search ................. 99/348, 452, 494, 455, 99/460, 516, 517; 426/518, 519; 425/206–209, 135, 151, 376 R, 200; 222/413; 241/282.1, 246, 247, 101 B, 199.12, 260.1; 366/81, 90, 140, 142, 144, 145, 149, 206, 194–196, 247, 323, 324, 318, 319, 293–296; 62/320, 342, 343

[56] References Cited

U.S. PATENT DOCUMENTS

| 69,174 | 9/1867 | Burns . |
| 512,528 | 1/1894 | Williams, Jr. . |
| 593,823 | 11/1897 | Talley et al. . |
| 760,481 | 5/1904 | Prenzel . |
| 867,018 | 9/1907 | Dennis et al. . |
| 940,944 | 11/1909 | Shepard . |
| 970,846 | 9/1910 | Miller . |
| 976,535 | 11/1910 | Woodcock . |
| 1,122,134 | 12/1914 | Lenhart . |
| 1,392,464 | 10/1921 | Thompson . |
| 2,004,704 | 6/1935 | Martin . |
| 2,203,672 | 6/1940 | Chester . |
| 2,249,263 | 7/1941 | Wheelwright . |
| 2,319,479 | 5/1943 | Nelson et al. . |
| 2,434,812 | 1/1948 | Roles . |
| 2,626,132 | 1/1953 | Reed . |
| 2,626,133 | 1/1953 | Reed . |
| 3,061,279 | 10/1962 | Reed . |
| 3,323,320 | 6/1967 | Conz . |
| 3,445,090 | 5/1969 | Lodige et al. . |
| 3,465,540 | 9/1969 | Carpigiani . |
| 3,630,493 | 12/1971 | Carpigiani . |
| 3,739,711 | 6/1973 | Nieblach . |
| 4,403,868 | 9/1983 | Kupka . |
| 4,448,114 | 5/1984 | Mayer . |
| 4,502,377 | 3/1985 | Hall, Jr. . |

Primary Examiner—Timothy F. Simone
Attorney, Agent, or Firm—Welsh & Katz, Ltd.

[57] ABSTRACT

A blending apparatus particularly adapted for blending or mixing candy, cookies, nuts or fruit with the material of a cold flowable substance, such as ice cream, includes a blending container, a rotatable auger having a rotatable cutter displaceable into and out of the container, and a device for causing recirculation of at least a portion of the ingredients within the container during mixing. The auger is rotatable within the container with the cutter being rotated at a different angular velocity from the auger. The cutter is effective to cut large portions of the ingredients in the container into smaller portions.

8 Claims, 5 Drawing Figures

BLENDING MACHINE

This is a continuation of application Ser. No. 616,965, filed June 4, 1984, abandoned.

BACKGROUND OF THE DISCLOSURE

This application relates to blending or mixing apparatus. More specifically, this application relates to apparatus for blending or mixing a substance such as candy cookies, nuts or fruit witht he material of a cold flowable substance e.g. ice-cream.

A development in the refreshment field has been made with respect to the marketing or products generally falling within the general category of ice-cream products. This development contempaltes that ice-cream be blended with or otherwise mixed with products such as candy e.g., individual candies such as M & M candy and the like, cookies, nuts, fruit or any of many desired materials which may be considered to enhance the taste and desirability of ice cream.

To provide such a product, apparatus have been developed to achieve the desired mixing or blending. For the most part these apparatus have included a container having a mixing means disposed therein. The container is designed to receive the ingredients being mixed. to contain the mixing operation and thereafter to permit discharge of the mixed materials.

Mixing devices of a known type, however, have not proven satisfactory. One problem experienced with respect to such devices has been their inability to achieve satisfactory and relatively uniformed blending. A second problem experienced with such apparatus has been their inability to maintain the products being mixed in a proper refrigerated state. In this regard, failure to maintain the products n the proper refrigerated state during blending and during dispensing results in a greatly reduced viscosity, i.e. a soupy product, clogging of the apparatus, and unacceptable down time to clean the machine between uses to prevent bacteria build up.

An additional and very serious problem with known apparatus has been the development of high pressures in the mixing container, particularly adjacent the discharge orifice, during operation of the apparatus. Such high pressure causes poor blending, adverse structural problems with the equipment potentially causing shortened equipment life, and overall poor operation.

SUMMARY OF THE INVENTION

It is an object of the present invention, therefore, to provide a blending machine which is uniquely suitable for use in blending flowable materials.

It is another object of the present invention to provide a blending machine wherein materials such as ice-cream and additive materials may be mixed or blended to achieve relatively uniform blending in a short period of time.

Yet an additional object of the present invention is to provide a novel blending machine wherein the blending chamber is uniformly refrigerated to maintain the ingredients at a desired and proper consistency during the blending operation and during subsequent dispensing of the product.

Yet a further object of the present invention is to provide a novel blending machine wherein unacceptable back-pressures resulting from the blending operation are not experienced.

These objects and others not enumerated are achieved by the blending apparatus according to the invention, one embodiment of which may include a blending container, means displaceable into and out of said blending container for mixing ingredients contained in said blending container and means for uniformly lowering the temperature of the inner surface of the blending container.

BRIEF DESCRIPTION OF THE DRAWING

A more complete understanding of the present invention may be had from the following detailed description, particularly from read in light of the accompanying drawings, wherein:

FIG. 2A is a partial view, increased in scale, of the portion of FIG. 2 designated in the circular set off;

DETAILED DESCRIPTION

Figure 1:
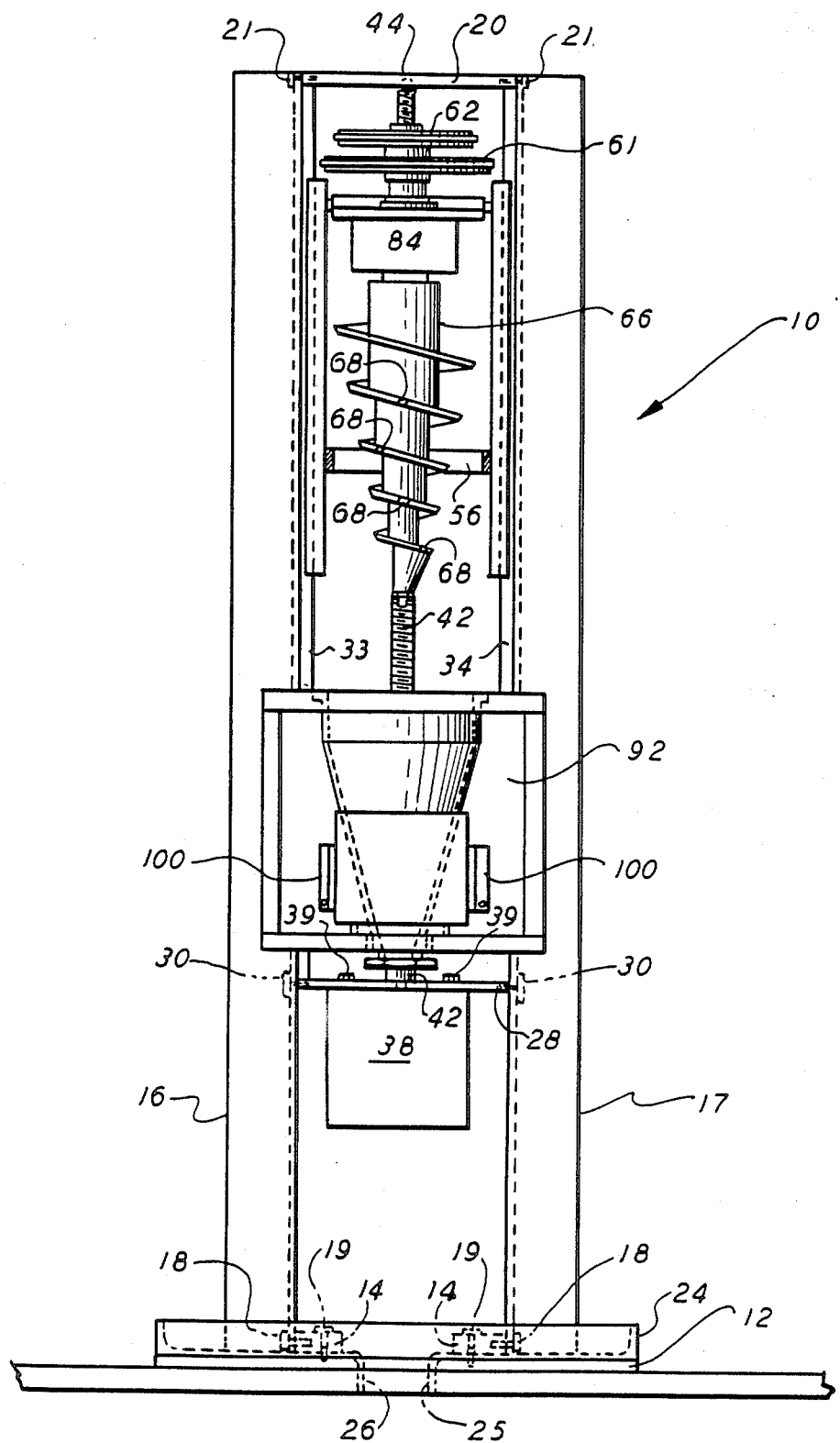
FIG. 1 is a front elevational view, having portions cut away, of a mixing apparatus according to the present invention.

Referring therefore to FIG. 1, an ice cream blending machine structured in accordance with the present invention is shown and designated generally by reference numeral 10.

Machine 10 includes a base plate 12 which may be secured such as by bolts or other suitable means (not shown) to a support platform such as a sturdy counter top or the like. Rigidly secured to the upper surface of base plate 12 are positioning plates 14. The positioning plates 14 are displaced to either side of center, as best may be seen in FIG. 1, and define both positioning means and securing means for first and second, vertically disposed U-shaped channels 16 and 17. Channels 16 and 17 are oriented such that their open aspects are facing outwardly with respect to the central vertical axis of the machine. Further, channels 16 and 17 are disposed by positioning plates 14 such that their respective flanges are co-planar and the plans of their webs are parallel.

Channels 16 and 17 are secured to positioning plate 14 by a plurality of machine screws 18 which pass through suitable bores in the webs of the channels and which are threadedly received within tapped bores formed in positioning plates 14. Similarly, positioning plates 14 are secured to base plate 12 by machine screws 19 received through bores in plates 14 and threadedly engaged in tapped bores formed in baseplate 12.

The upper ends of channels 16 and 17 are rigidly secured together in the desired spaced position by a thrust plate 20 which extends between the webs of channels 16 and 17. Thrust plate 20 is secured to channels 16 and 17 by a plurality of machine screws 21 which are slidably received through suitable bores formed in the webs of channels 16 and 17 and which are threadedly received within tapped bores formed in thrust plate 20.

Figure 2:
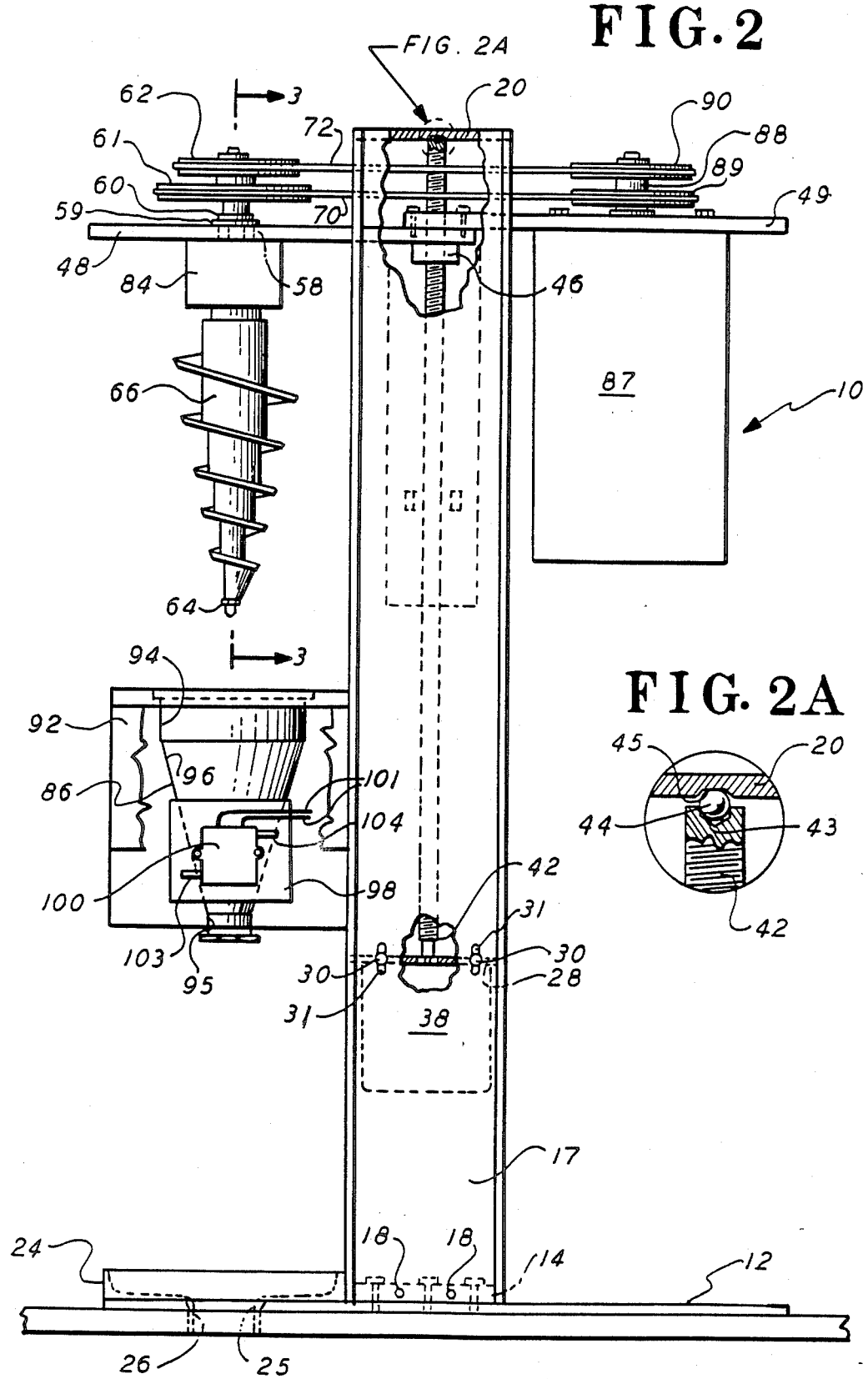
FIG. 2 is a side elevational view, also having portions cut away, of a mixing apparatus according to the present invention.

Also secured to mounting plate 12, forward of channels 16 and 17 (as best seen in FIG. 2), is a drain assembly including a drain pan 24 having a drain pipe stub 25 depending therefrom. Stub 25 extends downwardly from pan 24 into and through a through bore 26 formed in base plate 12. Further, the lower end of stub 25 is suitable for connection to a drain line or other suitable means for disposing of waste materials from pan 24.

Disposed upwardly of mounting plate 12 and secured between channels 16 and 18 is a gear motor support plate 28. Support plate 28 is substantially identical in perimetric configuration to thrust plate 20 such as to extend between and be secured to channels 16 and 17. Gear motor support plate 28 is adjustably secured to channels 16 and 17 by a plurality of machine screws 30 which extend through vertically extending slots 31 (FIG. 2) formed in the webs of channels 16 and 17 and which are threadedly received within tapped bores formed in support plate 28. As will be recognized by those skilled in these arts, adjustment of the vertical position of support plate 28 is achieved by loosening screws 30, sliding the support plate 28 vertically within the limits of slots 31 to the desired position, and tightening screws 30. It should also be noted that support plate 28 may be rigidly mounted with respect to channels 16 and 17, in which case thrust plate 20 would be adjustably vertically mounted by providing vertically oriented slots in channels 16 and 17 for slidably and adjustably receiving machine screws 21 therethrough.

Extending vertically between thrust plate 20 and support plate 28 are first and second guide rails 33 and 34 respectively. (See FIGS. 1 and 4). First guide rail 33 is secured to the interior face of the web of channel 16 by suitable means such as machine screws (not shown), at a position generally centrally of the flanges of channel 16. Similarly, second guide rail 34 is secured to the interior face of the web of channel 17 at a position generally centrally of the flanges of the web of channel 17.

The interior surface of first guide rail 33 is relieved to define a vertically extending channel 35 for receiving a cam follower as is discussed below in detail. Similarly, the interior surface of second guide rail 34 is relieved to define a vertically extending channel 36, also for receiving a cam follower.

Rigidly secured to the underside of support plate 28 is a worm drive motor 38. The motor is secured by bolts 39 which extend through bores formed in support plate 28 and which are recieved within suitable bores in motor 38. The output shaft of motor 38 is operatively connected such as by keying or the like, to a vertically extending threaded shaft 42. The upper end of shaft 42 is provided with a shallow, axially extending bore 43 in which is recieved a ball bearing 44 which cooperates with a recess 45 in thrust plate 20 such as to act as a thrust bearing for shaft 42. This structure best may be seen in FIG. 2A.

Threaded shaft 42 is provided with ball screw threads which cooperate with a ball nut follower 46. Ball nut follower 46 is threadedly engaged with shaft 42 such that rotation of shaft 42 in response to operation of motor 38 causes upward or downward displacement of follower 46 depending upon the direction of rotation of shaft 42.

Resting on the upper surface of ball nut follower 46 is an auger spindle mounting plate 48. Auger spingle mounting plate 48 exxtends into the area which is central of channels 16 and 17., The forward portion of plate 48 defines a support means for the auger system described below and its drive spindles. That section of auger spindle mounting plate 48 which is disposed centrally of channels 16 and 17 is provided with a throughbore to accommodate the passage therethrough of shaft 42.

Similarly, resting on th inner upper surface of mounting plate 48 and secured thereto by bolts as to discussed below is auger motor mounting plate 49.

Rigidly secured to the lower surface of mounting plate 48 are a first cam follower support plate 50 and a second cam follower support plate 51. First cam follower support plate 50 is a generally rectangular plate which depends from the lower surface of mounting plate 48 and which defines a mounting means for a cam follower 53 (FIG. 4) which is operatively received within the channel 35 of first guide rail 33. Similarly, second cam follower support plate 51 is a generally rectangular plate which depends from the lower surface of mounting plate 48 and which defines a mounting means for a cam follower 54 which is operatively received within the channel 36 of second guide rail 34. In this regard the followers 53 and 54 may be rollers or other suitable cam follower means from among those which are well known to those having skill in these arts. Further, there may be more than one cam follower attached to the respective plates 50 and 51 if it is so desired.

Transverse positioning of support plates 50 and 51 is achieved by the provision of parallel spacer bars 55 and 56 which extend generally horizontally between and which are secured to plates 50 and 51. Forward spacer bar 55 is positioned in front of threaded shaft 42 and rearward space bar 56 is positioned behind threaded shaft 42 as best may be seen in FIG. 4. In this regard, if so desired only a single spacer bar may be utilized. As support plate 48 is displaced upwardly or downwardly by the operation of motore 38 and therewith the rotation of threaded shaft 42, the cooperation of cam followers 53 and 54 within channels 35 and 36 respectively, retains support plate 48 in proper angular alignment with respect to shaft 42 and thus, in proper operating position.

Disposed on the forward end of mounting plate 48 is a throughbore 58. Coaxial with throughbore 58 and supported by the upper surface of mounting plate 48 are a bearing flange 59, a journal bearing 60, an auger drive pulley 61 and a cutter drive pulley 62. Cutter drive pulley 62 is rigidly secured to a cutter shaft 63 which extends vertically coaxially within throughbore 58. Disposed on the lower end of cutter shaft 63 is a cutter device 64, the structure and operation of which are discussed below in detail.

Mounted between journal bearing 60 and cutter drive pulley 62 is auger drive pulley 61. Auger drive pulley 61 is rigidly secured to a cylindrical auger shaft 65 which is rotatably received through and coaxial with throughbore 58. Secured to the lower end of auger shaft 65 is auger 66. The cylindrical structure of shaft 65 permits cutter shaft 63 to extend coaxially therethrough. Thus, auger shaft 65 is disposed concentrically of cutter shaft 63 and adapted for relative rotational movement therebetween.

As best may be seen in FIGS. 1 and 2, the fluting of auger 66 is such as to cause downward displacement of material in response to clockwise rotation of the auger. The tendency toward such downward displacement tends to generate increased pressure in the material being displaced as it approaches the lower end ofthe auger. In order to preclude the generation of unacceptable pressures in apparatus 10, the lower portions of the periphery of the fluting of auger 66 are provided with a plurality of spaced notches 68. These notches permit backflow of material in amount sufficient to relieve downstream pressure. In this regard the size of the notches for any particular application may be determined empirically. However for the application of the preferred embodiment, i.e. for blending ice cream with other additives, a notch formed by a ⅜ inch diameter end mill disposed at an angle of 45 degress to the longitudinal asix of the auger has been found to operate satisfactorily. An additional beneficial effect of notches 68 is improved mixing and blending of the recirculation of the materials being blended.

As is discussed below in detail, pulleys 61 and 62 are operatively connected through suitable V-belts 70 and 72 to a drive means. By reason of the different effective diameters of pulleys 61 and 62 it is apparent that they are designed to rotate at different angular velocities. In this regard, as is discussed below in detail. V-belts 70 and 72 are driven by drive pulleys which are equal in diameter. Thus, in the ordinary operation of machine 10, the auger 66 and cutter 64 rotate at different angular velocities.

Figure 3:
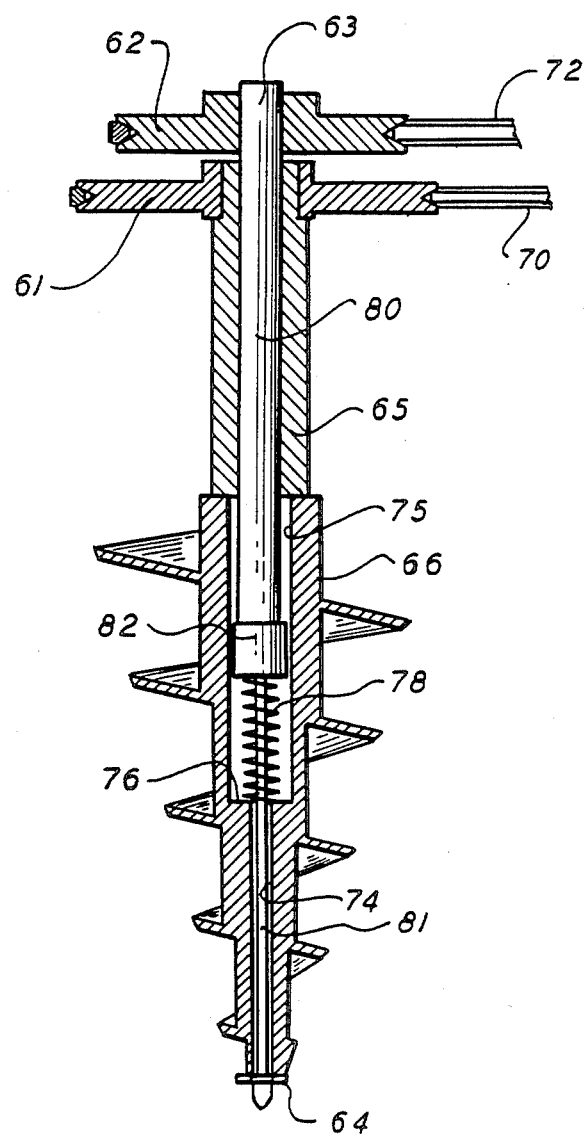
FIG. 3 is an elevational cross-sectional view of the auger and cutter structure utilized in the embodiment of mixing apparatus of FIG. 1.

As best may be seen in FIG. 3, auger 66 is provided with an axially extending throughbore 74 and a coutnerbore 75 coaxial therewith. The intersection of bore 74 and counterbore 75 defines a radially extending shoulder 76. Shoulder 76 defines a reaction surface for a spring 78 which cooperates with cutter shaft 63 to maintain cutter shaft 63 properly positioned within auger 66 including when the auger is removed from the machine for cleaning or the like.

Considering the structure of cutter shaft 63 in detail, the shaft includes an upper shaft section 80, a lower shaft section 81 and a coupling 82. Upper shaft section 80 and lower shaft section 81 are threadedly received within coaxial threaded bores provided in coupling 82. It will be recognized, however, that other coupling structures, e.g. bayonet type couplings, may also be utilized to connect the respective shaft sections. The lower radial surface of coupling 82 defines an upper reaction surface for spring 78. The force exerted by spring 78 against coupling 82 tends to displace cutter shaft 63 upwardly thus establishng and maintaining a surface-to-surface engagement between the upper surface of cutter device 64 and the lower surface of auger 66. The upper shaft section 80 is opeatively secured, such as by keying or the like, to cutter drive pulley 62 for rotation therewith.

Rigidly secured to the lower surface of mounting plate 48 and coaxial with cutter shaft 63 is a bearing box 84 through which is rotatably received cylindrical auger shaft 65. Thus, the auger assembly is rotatably supported vertically by bearing 60 and for rotation by the cooperation of bearing 60 and the bearings of bearing box 84. As is discussed below in detail, the effective angle of taper of auger 66 corresponds to the vertical angle of blending receiver 86.

Rigidly secured to the under surface of the rearward portion of mounting plate 49 is a drive motor 87. Rigidly secured to the output shaft od drive motor 87 is a two-stage pulley 88 having a first sheave 89 acting as an auger drive pulley and a second sheave 90 acting as a cutter drive pulley. Auger drive pulley sheave 89 is connected to auger pulley 61 through V-belt 72. Thus, operation of drive motor 87 causes the rotation of sheaves 89 and 90 and through V-belts 70 and 72, also the rotation of pulleys 61 and 62. As noted above, the fact that the diameters of sheaves 89 and 90 are equal, coupled with the difference in diameters between pulleys 61 and 62, causes the auger 66 and cutter 64 to rotate at different angular velocities thus enhancing the operation of the blending machine.

Figure 4:
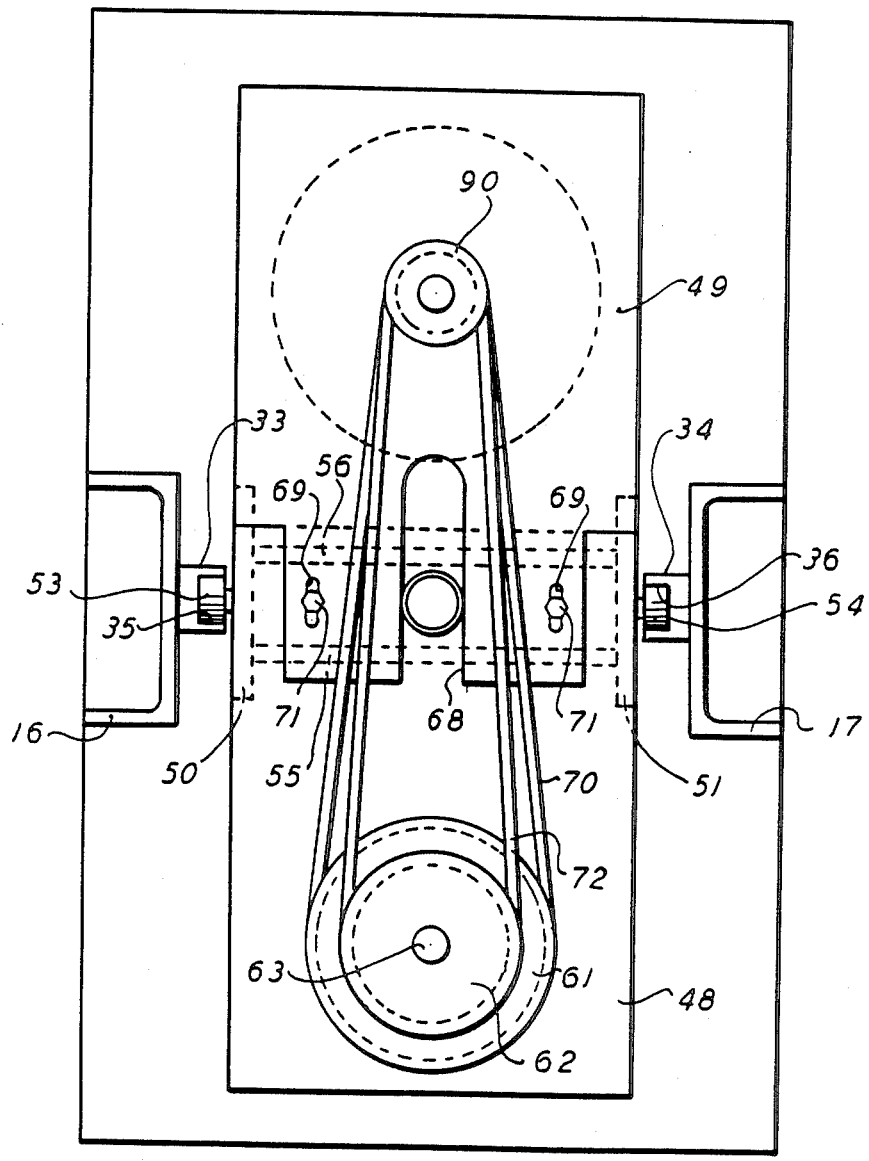
FIG. 4 is a top view of the apparatus of FIG. 1.

Referring to FIG. 4, it can be seen that mounting plate 49 is provided with a center slot 68, the longitudinal axis of which is along a line connecting the centers of rotation of cutter shaft 63 and second sheave 90. Slot 68 permits the passage therethrough of shaft 42. Spaced from and on either side of slot 68 as a pair of slots 69 the longitudinal axis of which are parallel to the axis of slot 68. Slots 69 accommodate the passage therethrough of bolts 71 which also pass through suitable bores in plate 48. Thus, by loosening bolts 71 and diisplacing plate 49 with respect to plate 48, the tension on V-belt, 70 and 72 may be suitably adjusted.

Considering now blending receiver 86, the receiver structure is mounted within a support box 92 rigidly secured such as by bolts or the like to the front surfaces of the flanges of U-shaped channels 16 and 17. Mounted within support box 92 is blding receiver 86. Blending receiver 86 includes a container having an upper cylindrical section 94, a lower cylindrical section 95 having a diameter smaller than upper cylindrical section 94, and a central conical section 96 the upper diameter of which equal to the diameter of section 94 and the lower diameter of which is equal to the diameter of section 95. In this regard, the angle of taper of conical section 96 corresponds to the angle of taper of auger 66 which, during the operation of aapparatus 10, is received within blending receiver 86 such that the perimetric surface of auger 66 is within a short distance, e.g. 0.005 inches, of the surface of receiver 86.

Disposed in the bottom of lower cylinder section 95 is discharge orifice having an orifice plate (not shown) mounted therein. The orifice plate is provided with an opening which controls the rate of discharge of blended materials from blending receiver 86. The opening may also be shaped such as to cause the materials being discharged to take on a desired configuration.

Rigidly secured to the outer lower portion of conical section 96 is a cooling ring 98. Cooling ring 98 may be made of suitable conductive material such as aluminum so as to facilitate removal of heat from blending receiver 86 during operation of machine 10. Disposed on opposite sides of cooling ring 98 are a first and second refrigeration element 100, only one being shown. Each refrigeration element includes a thermo-electric cooling element and a water-cooled heat sink. Thus heat is removed from cooling ring 98 by the thermo-electric cooler of elements 100 whereafter it is transferred to water flowing through the heat sinks. In this regard, as best may be seen in FIG. 2, the refrigeration elements 100 include electrical leads 101 for connection to a standard source of power, a water supply line 103 and a water discharge line 104. The amounts of water utilized for cooling are not great. Thus local water may be used for the heat transfer. Alternatively a closed loop water system with external heat exchange or other sources of water for heat transfer can also be utilized. The cooling capability of the heat removal means should be at least equal to the heat generation expected from operation of the auger 66 during blending.

The controls for worm drive motor 38 and drive motor 88 may be selected from any of the standard type motor controls which are well known to those having ordinary skills in these arts. It has been found that push button control elements are the most convenient for operators and render the operation of the device well within the capability of an operator with very little training.

Considering therefore the operation of the device and assuming that the apparatus is assembled as shown and the power has been provided, the first and second refrigeration elements 100 are activated to bring the temperature of the blending receiver 86 in the general vacinity of cooling ring 98 to the desired low temperature most appropriate for blending a mixture of ice-cream and candy in the context of the operation of the apparatus shown. In this regard it has been found that establishing and maintaining a temperature of approximately 20° F. or below has been most beneficial in the operation of the apparatus.

With the blending receiver procooled the operator will then load ice-cream into the blending receiver in the amount desired to provide either a single or doule portion of blended product. Thereafter, worm driver motor 38 is activated to advance auger 66 into the blending receiver 86 such as to pole a pocket into the previously charged ice-cream. In the embodiment shown, auger 66 is advanced to within 2 inches of the discharge orifice. Thereafter the motor 38 is reversed and the auger withdrawn to permit deposition of the blend-in materials, e.g candy, cookies, nuts or fruit or other such materials into the ice-cream.

Thereafter, motor 38 is activated to advance auger 66 into the ice-cream material. Upon advancement of the auger into receiver 86 by a desired amount, motor 88 is activated to cause rotation of auger 66 and cutter device 64 at different angular velociites as discussed above. The effect of the auger rotation and the rotation of cutting device 64 serves both to blend the ice cream with the blend-in materials such as to effect a consistent mixture of the materials and to advance the blended product out of the dispenser through the orifice plate to provide an attractive single or double portion no matter what the relative consistency of the ingredients being blended. The rotation of the cutter cooperates with the discharge orifice to cut any large portion of blending ingredient which may pass into the area of the discharge orifice thus improving blending and also precluding blockage of the discharge orifice.

Upon completion of the mixing and discharge cycles the auger is withdrawn. Thereafter the blending receiver and auger can be rinsed in anticipation of a subsequent charge of materials. In this regard it will be recognized by those skilled in the art that a permenantly installed rinse water nozzle may be provided to facilitate cleaning the blending receiver and auger between loads. It has been found that rinsing is best achieved by advancing auger 66 into receiver 86 and therefater rinsing the auger and chamber at the same time.

As will be recognized by those having skilled in these arts the blending apparatus as disclosed above constitues a unique apparatus having particular utility with respect to the blending of ice-cream with nearly any type of materials such as candy, cookies, nuts or fruit. Maintaining the blending receiver in a refrigerated state facilitates the blending and provides for consistent product cycle after cycle.

The apparatus itself may be constructed using well known materaisl which are consistent with food handling needs where the blending is for food purposes, which materials may be chosen from any of the well knowns of those having ordinary skill in these arts.

It will also be recognized that many modifications will be made to the disclosed preferred embodiment without departing from the spirit and scope of this invention.

What is claimed is:

1. A blending apparatus comprising:
   a blending container;
   auger means displacable into and out of said blending container;
   said auger means being rotatable within said container for mixing ingredients contained in said blending container and having cutter means rotatable with respect to said auger means, said cutter means being rotatable at a different angular velocity from said auger means and in the same angular direction as said auger means, said cutter means being effective to cut large poritons of said ingredients contained in said blending container into smaller portions; and
   means for causing recirculation of at least a portion of the ingredients within the container during mixing.

2. A blending apparatus according to claim 1 wherein said auger means includes a fluted portion for advancing materials in a first direction and notch means formed in said auger means for permitting flow of said materials in a direction generally opposite to said first direction to effect said recirculation.

3. A blending apparatus according to claim 1 including means for uniformly lowering the temperature of the inner surface of the blending container.

4. Apparatus according to claim 3 wherein said means for lowering the temperature of the inner surface of the blending container comprises a cooling ring on at least a portion of said blending container and means for lowering the temperature of said cooling ring.

5. Apparatus according to claim 4 wherein said cooling ring is in surface contact with the external surface of said blending container and said means for lowering the temperature of said cooling ring is secured to said cooling ring.

6. Apparatus according to claim 1, 2, 3, 4 or 8 including means for rotating said auger means and means for rotating said cutter means at an angular velocity which is not equal to the angular velocity of rotation of said auger means.

7. Apparatus according to claim 1, 2, 3, 4 or 5 wherein said auger means is mounted on a first shaft, said cutter means is mounted on a second shaft, and wherein said first and second shafts are concentric.

8. Apparatus according to claim 6 wherein said auger means is mounted on a first shaft, said cutter means is mounted on a second shaft, and wherein said first and second shafts are concentric.

* * * * *